United States Patent
Diekevers et al.

(10) Patent No.: US 10,252,378 B2
(45) Date of Patent: Apr. 9, 2019

(54) HYBRID LASER CLADDING COMPOSITION AND COMPONENT THEREFROM

(71) Applicant: Caterpillar Inc., Peoria, IL (US)

(72) Inventors: Mark S. Diekevers, Washington, IL (US); Robert L. Meyer, Metamora, IL (US); Scott H. Magner, Dunlap, IL (US); Gregory W. Tomlins, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 575 days.

(21) Appl. No.: 14/964,935

(22) Filed: Dec. 10, 2015

(65) Prior Publication Data

US 2017/0165794 A1 Jun. 15, 2017

(51) Int. Cl.
*B23K 35/24* (2006.01)
*B23K 35/362* (2006.01)
*B23K 35/40* (2006.01)

(52) U.S. Cl.
CPC ............ *B23K 35/24* (2013.01); *B23K 35/362* (2013.01); *B23K 35/406* (2013.01)

(58) Field of Classification Search
CPC ..... B23K 35/24; B23K 35/362; B23K 35/406
See application file for complete search history.

(56) References Cited

U.S. PATENT DOCUMENTS

| | | | |
|---|---|---|---|
| 4,010,309 A * | 3/1977 | Petersen | B23K 35/302 148/23 |
| 6,089,683 A * | 7/2000 | Anderton | B23P 15/00 305/101 |
| 7,776,451 B2 * | 8/2010 | Jiang | C23C 4/12 428/457 |
| 7,951,469 B2 | 5/2011 | Osuki et al. | |
| 8,287,805 B2 | 10/2012 | Sjodin | |
| 2007/0187379 A1 * | 8/2007 | Osuki | C22C 19/053 219/137 WM |
| 2009/0305078 A1 * | 12/2009 | Sjodin | B23K 35/3053 428/656 |
| 2010/0136361 A1 * | 6/2010 | Osuki | C22C 19/05 428/576 |
| 2011/0114606 A1 * | 5/2011 | Suzuki | B23K 35/0266 219/74 |
| 2011/0200843 A1 * | 8/2011 | Osuki | C22C 19/05 428/679 |
| 2011/0288630 A1 * | 11/2011 | Blanzy | A61C 7/20 623/1.15 |

(Continued)

FOREIGN PATENT DOCUMENTS

EP 2574420 10/2014

*Primary Examiner* — Ibrahime A Abraham
*Assistant Examiner* — Frederick F Calvetti
(74) *Attorney, Agent, or Firm* — Bookoff McAndrews

(57) ABSTRACT

A cored wire for hybrid laser cladding includes a hollow metal sheath and a core powder composition. The core powder can include, by weight percent: carbon from about 0.8% to about 1.2%, manganese from about 1% to about 1.4%, silicon from about 0.8% to about 1%, chromium from about 22% to about 30%, titanium from about 0.5% to about 2%, vanadium from about 0.5% to about 2%, boron from about 0.8% to about 1.2%, phosphorus from 0% to about 0.04%, and sulfur from 0% to about 0.03%, the balance of the core powder composition being substantially iron. Components and methods using the cored wire are also disclosed.

11 Claims, 2 Drawing Sheets

(56) References Cited

U.S. PATENT DOCUMENTS

2013/0171472 A1* 7/2013 Takeda ............... B23K 35/0261
428/683
2014/0322560 A1* 10/2014 Kobayashi ......... B23K 35/3086
428/683
2016/0279742 A1* 9/2016 Lee ..................... C22C 38/04

* cited by examiner

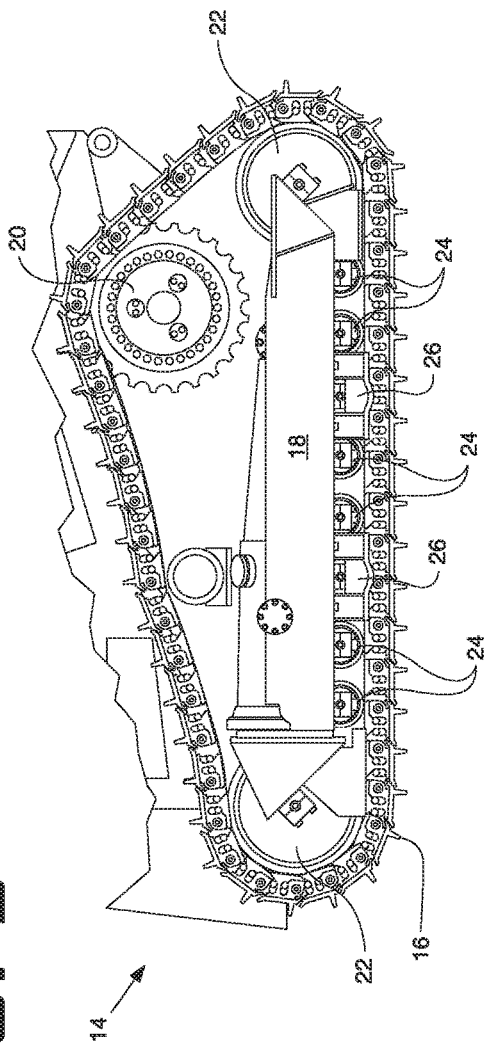
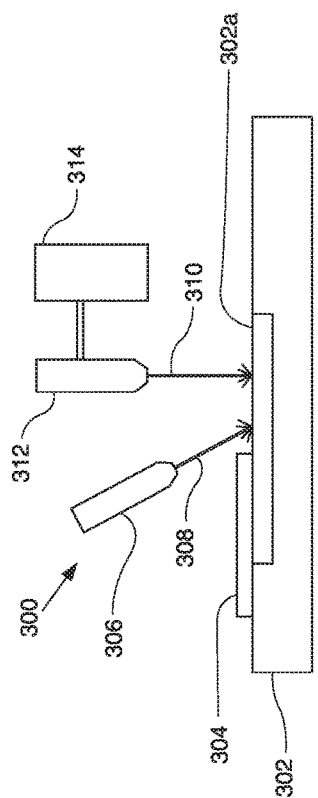

HYBRID LASER CLADDING COMPOSITION AND COMPONENT THEREFROM

TECHNICAL FIELD

This patent disclosure relates generally to powdered compositions for use in hybrid laser cladding processes and, to the use of such compositions and processes to manufacture the wear surfaces of machine components.

BACKGROUND

Many parts and components used in mechanical machines, such as track type tractors, dozers, or other machines with continuous tracks, have wear or counterface surfaces in moving or static contact with other components of the machine. An example of such a component is the track sealing system, such as a seal lip and a bushing end face, in the undercarriage of a continuous track. The wear surfaces of these components are subjected to structural and mechanical loads and friction due to the relative motion of the components. Because of these forces, the components are typically made from hard, strong materials such as alloyed steels and other metals. For undercarriages operating in a dry climate, generally known methods of producing a track sealing system are sufficient. However, in other environments, known treatments for sealing systems have relatively poor corrosion resistance, which results in accelerated wear of the counterface surface. This can reduce the life of the track sealing system.

The above concerns have prompted designers to propose various composite overlays to the components. One composite overlay is known from U.S. Pat. No. 7,776,451 to Jiang et al. Jiang '451 includes a method of forming a composite overlay compound on a substrate including forming a mixture including at least one component from a first group of component materials including titanium, chromium, tungsten, vanadium, niobium, and molybdenum. The mixture also includes at least one component from a second group of component materials including carbon and boron and at least one component from a third group of component materials including silicon, nickel, and manganese. The mixture of selected component materials is then applied to a substrate material to form an overly compound. The overlay compound is fused to the substrate to form a mettalurgical bond between the substrate material and the overlay compound.

SUMMARY

In one aspect of the disclosure, a cored wire is provided for surfacing steel alloy components via a hybrid laser cladding process. The cored wire can include a hollow metal sheath and a core powder composition. The core powder composition can include, as measured by weight percent, carbon (C) from about 0.8% to about 1.2%, manganese (Mn) from about 1% to about 1.4%, silicon (Si) from about 0.8% to about 1%, chromium (Cr) from about 22% to about 30%, titanium (Ti) from about 0.5% to about 2%, vanadium (V) from about 0.5% to about 2%, boron (B) from about 0.8% to about 1.2%, phosphorus (P) from 0% to about 0.04%, and sulfur (S) from 0% to about 0.03%, a balance of the core powder composition being substantially iron.

In another aspect, the disclosure provides a component having a counterface surface with a substrate and a cored wire deposited on the substrate with hybrid laser cladding wherein the cored wire comprises a hollow metal sheath and a core powder composition. The core powder composition comprises, by weight percent, carbon (C) from about 0.8% to about 1.2%, manganese (Mn) from about 1% to about 1.4%, silicon (Si) from about 0.8% to about 1%, chromium (Cr) from about 22% to about 30%, titanium (Ti) from about 0.5% to about 2%, vanadium (V) from about 0.5% to about 2%, boron (B) from about 0.8% to about 1.2%, phosphorus (P) from 0% to about 0.04%, and sulfur (S) from 0% to about 0.03%, a balance of the core powder composition being substantially iron.

In yet another aspect of the disclosure, there is described a method for manufacturing a machine component having a counterface surface. The method includes melting a cored wire on to a substrate with hybrid laser cladding so that the cored wire is deposited on the substrate and allowing the cored wire as melted to solidify and a form a solid layer bonded to the substrate; wherein the cored wire comprises a hollow metal sheath and a core powder composition, the core powder composition comprising, by weight percent, carbon (C) from about 0.8% to about 1.2%, manganese (Mn) from about 1% to about 1.4%, silicon (Si) from about 0.8% to about 1%, chromium (Cr) from about 22% to about 30%, titanium (Ti) from about 0.5% to about 2%, vanadium (V) from about 0.5% to about 2%, boron (B) from about 0.8% to about 1.2%, phosphorus (P) from 0% to about 0.04%, and sulfur (S) from 0% to about 0.03%, a balance of the core powder composition being substantially iron.

BRIEF DESCRIPTION OF THE DRAWINGS

FIG. 2 depicts a undercarriage track assembly of the machine; and

FIG. 3 is a schematic illustration of a laser cladding process for manufacturing the wear surfaces of machine components using a cored wire.

DETAILED DESCRIPTION

Figure 1:
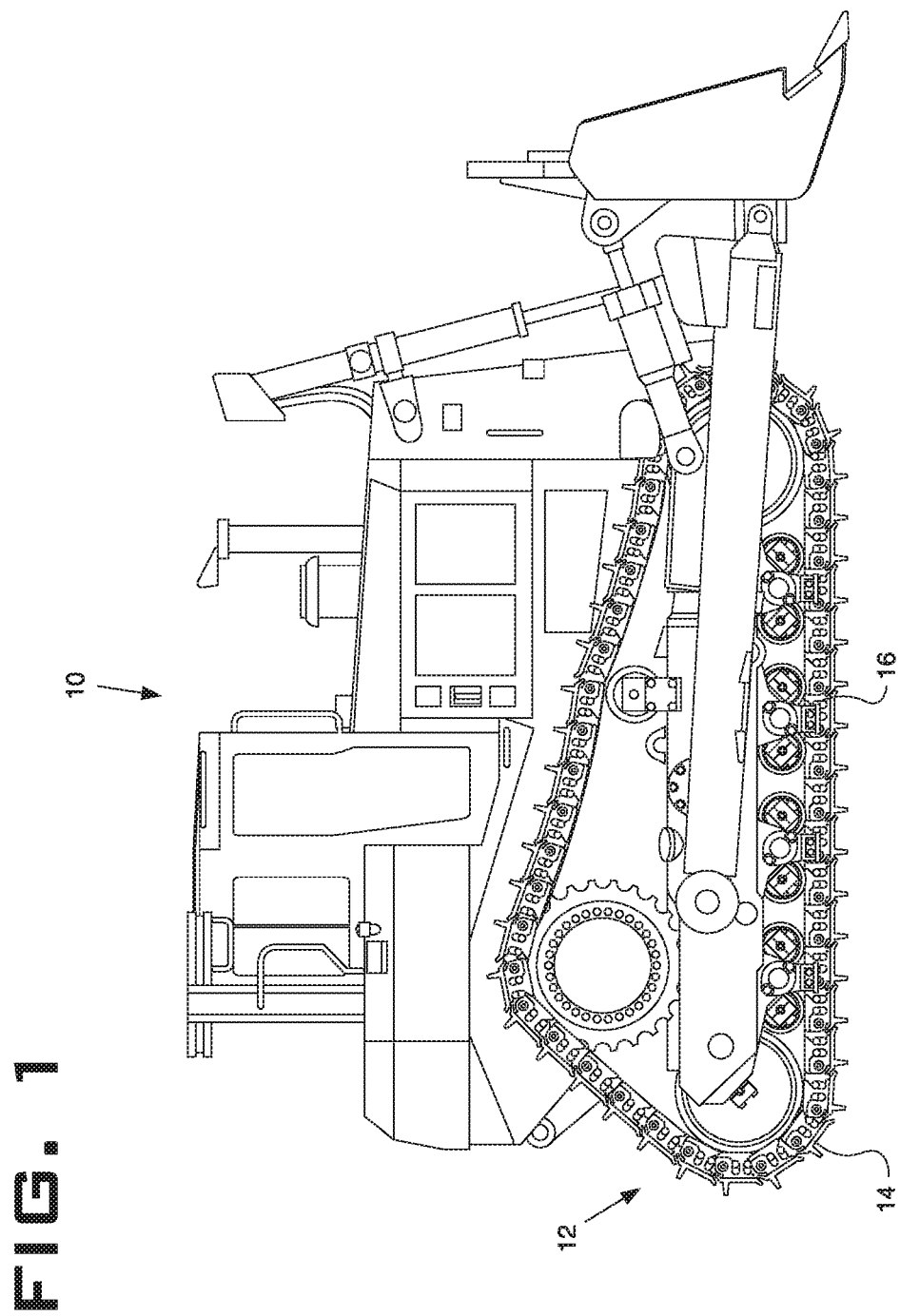
FIG. 1 is a drawing of a machine including an undercarriage and a track assembly.

This disclosure relates to materials, compositions, and methods for manufacturing machine components via a laser cladding process. Machines, such as track type tractors or excavators, include continuous track assemblies that are subject to wear. Compositions have been developed to increase the hardness and wear resistance of the components subject to wear. The disclosed compositions can be applied to a wide range of components that receive a layer of cladding material to provide a counterface surface having wear and corrosion resistance.

Referring to FIG. 1 of the drawings, a machine 10 is shown that includes an undercarriage 12 with a track assembly 14 having a continuous track 16, consistent with the present disclosure. While only a single track assembly 14 is shown in FIG. 1, it will be understood that a second track assembly 14 may be provided on the side of the machine 10 opposite the side that is shown in FIG. 1. Although the machine 10 is illustrated as a track type tractor, the machine 10 may be of any other type that includes a continuous track 16. Thus, as used herein, the term "machine" refers to a mobile track type machine that performs a driven operation involving physical movement associated with a particular industry, such as earthmoving, construction, mining, forestry, and agriculture. Examples of machines to which the present disclosure is applicable include earth-moving vehicles, excavators, tractors, dozers, loaders, backhoes, agricultural equipment, material handling equipment, mining machines, and other types of machines that operate in a work environment. The machine 10 of FIG. 1 is shown primarily for illustrative purposes to assist in disclosing features of the present disclosure and accordingly FIG. 1 does not depict all of the components associated with the machine 10.

The undercarriage 12 supports the machine 10 and may be operable to move the machine 10 along a work surface such as the ground, roads, and other types of terrain. As shown in FIG. 2, the track assembly 14 of the undercarriage 12 may include the continuous track 16, a track roller frame 18 and various guiding components supported by the track roller frame 18 that engage with and guide the continuous track 16. The guiding components may include one or more drive sprockets 20, idlers 22, track roller assemblies 24, and track guides 26, although other components may be used.

To further improve strength of the component, the wear surfaces may be subjected to additional hardening processes that increase the hardness of the material proximate the wear surfaces. These hardening processes can include hybrid laser cladding among other processes.

A hybrid laser process includes joining a metal powdered composition to a metal substrate via hybrid laser cladding. Joining the metal powdered composition to the metal substrate typically requires melting the metal powdered composition and a surface of the metal substrate together to form a molten metal pool and allowing the pool to cool and solidify. The result is that the metal powdered composition is firmly affixed to the metal substrate.

Referring to FIG. 3, there is illustrated an exemplary hybrid laser cladding process for depositing a counterface layer. A hybrid laser cladding system 300 includes a laser generator 312 and a heating element 306. The hybrid laser cladding system 300 generates and directs a laser beam 310 to impinge on a substrate 302 where the energy of the laser beam 310 melts a substrate 302 or maintains or limits a temperature gradient across the molten pool 302a. In the illustrated embodiment, to generate the laser beam 310, the laser cladding apparatus 300 can include a laser generator 312, which is supplied power with a power source 314. The laser generator 312 can emit a coherent beam of light or laser beam 310. The laser generator 312 can operate using any suitable amplification medium, for example, a gas-based medium, a crystal-based medium, or diode-based medium, and can generate laser beams 310 of any suitable wavelengths for use in cladding processes. Moreover, the laser generator 312 can generate any level of output power suitable for use in laser cladding processes, for example, on the order of one to several kilowatts.

In one or more embodiments, the heating element 306 is a welding-type torch head. Welding-type torch heads can include torch heads for gas tungsten arc welding, gas metal arc welding, submerged arc welding, plasma arc welding, and flux core arc welding. With the welding-type torch heads, the cored wire 308 is melted with an arc. The laser 310 can limit the temperature gradient across the molten pool 302a. In some embodiments, the heating element 306 can lead the laser 310. In other embodiments, the laser 310 can lead the heating element 306. Further, in other embodiments, the welding-type torch head and the laser generator may be combined into one head.

The cored wire is applied to the surface of the substrate 302 using a hybrid laser cladding process. In one embodiment, the cored wire can include a hollow metal sheath and a core powder composition. The core powder composition can include, as measured by weight percent, carbon (C) from about 0.8% to about 1.2%, manganese (Mn) from about 1% to about 1.4%, silicon (Si) from about 0.8% to about 1%, chromium (Cr) from about 22% to about 30%, titanium (Ti) from about 0.5% to about 2%, vanadium (V) from about 0.5% to about 2%, boron (B) from about 0.8% to about 1.2%, phosphorus (P) from 0% to about 0.04%, and sulfur (S) from 0% to about 0.03%, a balance of the core powder composition being substantially iron.

In another embodiment, the core powder composition can include, by weight percent, 1% carbon (C), 1.2% manganese (Mn), 0.9% silicon (Si), 25% chromium (Cr), 1% boron (B), 0.75% titanium (Ti), 0.75% vanadium (V), 0.01% phosphorus (P), 0.01% sulfur (S), a balance of the core powder composition being substantially iron.

The core powder compositions can include residual amounts of nickel (Ni), molybdenum (Mo), copper (Cu), and calcium (Ca). For example, residual amounts may include 0% to 0.3% nickel (Ni), 0% to 0.08% molybdenum (Mo), 0% to 0.35% copper (Cu), and 0% to 0.2% calcium (Ca).

In some embodiments, the cored wire can be applied via hybrid laser cladding to obtain a machine component with a counterface surface having corrosion and abrasion resistance. For example, the machine component can include an undercarriage track sealing system, a track joint, or other types of seals.

EXAMPLE

In one exemplary embodiment, the core powder composition may include, by weight percent, 1% carbon (C), 1.2% manganese (Mn), 0.9% silicon (Si), 25% chromium (Cr), 1% boron (B), 0.75% titanium (Ti), 0.75% vanadium (V), 0.01% phosphorus (P), 0.01% sulfur (S), a balance of the core powder composition being substantially iron. The hollow sheath may be a low carbon steel. The substrate may be low alloy carbon manganese boron steel. The cored wire may be applied to the substrate using hybrid laser cladding. For example, the cored wire may be applied to components in a track sealing system, such as a seal lip or a bushing end face.

In a bench test, the substrate with the applied cored wire showed a two to three fold improvement in wear depth over typical parts, while the wear was slightly improved. The test compound also showed improved corrosion resistance.

INDUSTRIAL APPLICABILITY

The industrial applicability of the compositions and methods described in this disclosure will be readily appreciated from the foregoing description. In use, a method of manufacturing a machine component having a counterface surface includes melting a cored wire 308 on to a substrate 302 with hybrid laser cladding so that the cored wire 308 is deposited on the substrate 302 and allowing the cored wire 308 as melted to solidify and a form a solid layer 304 bonded to the substrate 302. The cored wire includes a hollow metal sheath and a core powder composition, the core powder composition comprising, by weight percent, carbon (C) from about 0.8% to about 1.2%, manganese (Mn) from about 1% to about 1.4%, silicon (Si) from about 0.8% to about 1%, chromium (Cr) from about 22% to about 30%, titanium (Ti) from about 0.5% to about 2%, vanadium (V) from about 0.5% to about 2%, boron (B) from about 0.8% to about 1.2%, phosphorus (P) from 0% to about 0.04%, and sulfur (S) from 0% to about 0.03%, a balance of the core powder composition being substantially iron.

The above-described composition and methods are generally applicable to new and used components. For example, a new component may be manufactured to include a layer of cladding material. In addition, an already used component may be remanufactured to include a layer of cladding material.

It will be appreciated that the foregoing description provides examples of the disclosed composition and method. However, it is contemplated that other implementations of the disclosure may differ in detail from the foregoing examples. All references to the disclosure or examples thereof are intended to reference the particular example being discussed at that point and are not intended to imply any limitations as to the scope of the disclosure more generally.

What is claimed is:

1. A cored wire for hybrid laser cladding comprising:
   a hollow metal sheath, and
   a core powder composition comprising, by weight percent: 1% carbon (C), 1.2% manganese (Mn), 0.9% silicon (Si), 25% chromium (Cr), 0.75% titanium (Ti), 0.75% vanadium (V), 1% boron (B), 0.01% phosphorus (P), and 0.01% sulfur (S), a balance of the core powder composition being iron.

2. The cored wire of claim 1, wherein the hollow metal sheath is a low carbon steel.

3. The cored wire of claim 1, further comprising, by weight percent, nickel (Ni) from 0% to about 0.3%, molybdenum (Mo) from 0% to about 0.8%, copper (Cu) from 0% to about 0.35%, and calcium (Ca) from 0% to about 0.2%.

4. A component having a counterface surface comprising:
   a substrate; and
   a cored wire deposited on the substrate with hybrid laser cladding;
   wherein the cored wire comprises a hollow metal sheath and a core powder composition, and the core powder composition comprises, by weight percent, 1% carbon (C), 1.2% manganese (Mn), 0.9% silicon (Si), 25% chromium (Cr), 0.75% titanium (Ti), 0.75% vanadium (V), 1% boron (B), 0.01% phosphorus (P), and 0.01% sulfur (S), a balance of the core powder composition being iron.

5. The component of claim 4, wherein a surface of the substrate is melted with hybrid laser cladding, and the cored wire is affixed to the surface of the substrate.

6. The component of claim 4, wherein the substrate is a low alloy carbon, manganese, boron steel and the hollow metal sheath is a low carbon steel.

7. The component of claim 4, further comprising, by weight percent, nickel (Ni) from 0% to about 0.3%, molybdenum (Mo) from 0% to about 0.8%, copper (Cu) from 0% to about 0.35%, and calcium (Ca) from 0% to about 0.2%.

8. A method of manufacturing a machine component having a counterface surface comprising:
   melting a cored wire on to a substrate with hybrid laser cladding so that the cored wire is deposited on the substrate; and
   allowing the cored wire as melted to solidify and a form a solid layer bonded to the substrate;
   wherein the cored wire comprises a hollow metal sheath and a core powder composition, the core powder composition comprising, by weight percent, 1% carbon (C), 1.2% manganese (Mn), 0.9%, silicon (Si), 25% chromium (Cr), 75% titanium (Ti), 75% vanadium (V), 1% boron (B), 0.01% phosphorus (P), 0.01% sulfur (S), a balance of the core powder composition being iron.

9. The method of claim 8, further comprising melting a surface of the substrate so that the cored wire as melted and the surface of the substrate as melted join together.

10. The method of claim 8, wherein the substrate is a low alloy carbon, manganese, boron steel and the hollow metal sheath is a low carbon steel.

11. The method of claim 8, wherein the core powder composition further comprises, by weight percent, nickel (Ni) from 0% to about 0.3%, molybdenum (Mo) from 0% to about 0.8%, copper (Cu) from 0% to about 0.35%, and calcium (Ca) from 0% to about 0.2%.

* * * * *